Feb. 18, 1941.  R. C. MARTIN  2,232,400
MARSHMALLOW TOASTER
Filed Sept. 16, 1939
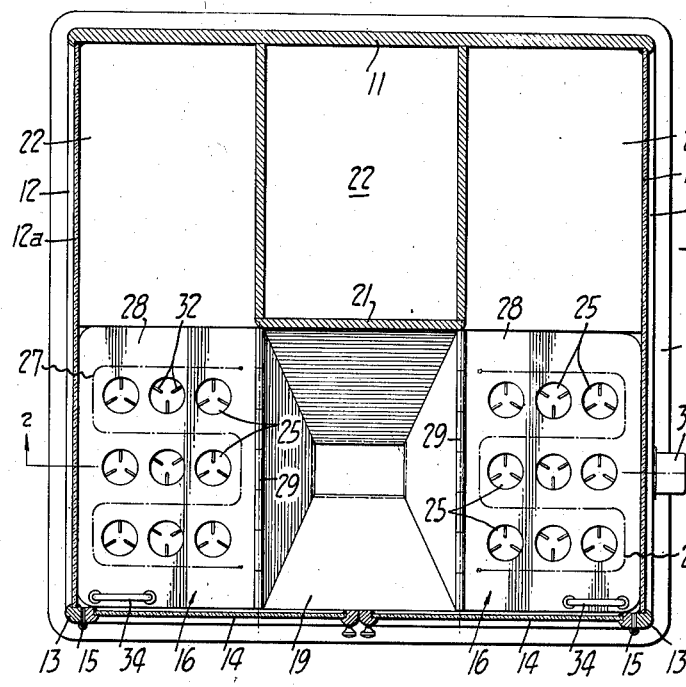
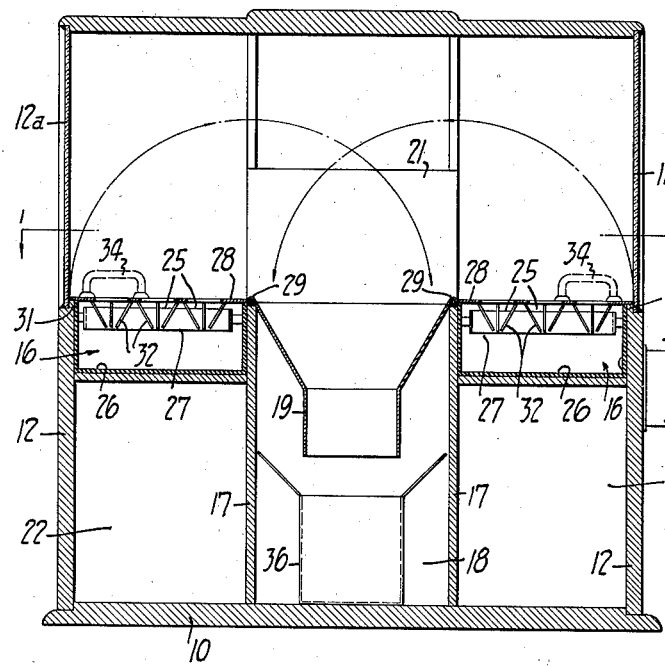
INVENTOR
Roy Chester Martin
BY
ATTORNEY Patented Feb. 18, 1941

2,232,400

UNITED STATES PATENT OFFICE 2,232,400

MARSHMALLOW TOASTER

Roy Chester Martin, West Summerville, Mass., assignor of one-half to Clifton Morey, Mare Island Navy Yard, Calif.

Application September 16, 1939, Serial No. 295,309

5 Claims. (Cl. 53—5)

My invention relates to a toasting apparatus for articles such as marshmallows, and is concerned more particularly with a provision of improved means of this character particularly adapted for the rapid toasting of marshmallows for sale to the public, at fairs, expositions and the like.

It is an object of the invention to provide an improved form of toasting or cooking apparatus for articles such as marshmallows.

Another object of the invention is to provide an improved marshmallow toaster which will provide an efficient toasting operation with a minimum opportunity for sticking of the marshmallows to the toaster.

Other objects of the invention will appear from the following description of a preferred embodiment thereof, taken in connection with the accompanying drawing, in which:

Fig. 1 is a sectional plan view of an apparatus embodying my invention taken as indicated by the line 1—1 in Fig. 2.

Fig. 2 is a vertical sectional view of the apparatus taken in a plane indicated by the line 2—2 in Fig. 1.

Fig. 3 is a plan view of one of the article holding pockets.

Fig. 4 is a sectional elevational view showing one of the article holding pockets with a marshmallow shown therein in its relation to the toasting element.

Generally the toaster of my invention includes a frame or case including base 10 having upright rear wall 11 mounted thereon from which respective side walls 12 having upper portions 12a of glass extend forwardly to front corner posts 13. The respective posts 13 have front doors 14 mounted thereon by hinges 15. Doors 14 preferably have panes of glass for visual inspection of the marshmallows while toasting.

Within the casing a pair of toasting compartments 16 are provided between interior longitudinal walls 17 between which discharge compartment 18 is provided having a discharge chute 19 mounted therein, having vertical guide partition 21 at its rearward side. The remainder of the space within the case may be used as storage compartments as indicated at 22.

Each toasting compartment 16 may be lined with suitable insulating material 26 and has a generally zigzag heating element 27 suitably secured by insulating posts to the side walls of the compartment. Associated with each heating element 27 is a toasting tray 28 mounted by hinge 29 at the upper edge of wall 17 and having its outer edge engaging a stop 31 provided on the adjacent side wall 12. The toasting tray 28 forms the cover for the toasting compartment and is provided with a plurality of toasting pockets 25, which are shown as formed in three parallel rows for cooperation with the zigzag form of the associated toasting element 27.

In a typical instance each pocket 25 may be formed by spaced marshmallow holder elements in the form of wires 32 equally spaced about the corresponding aperture in the tray 28 which converges inwardly and downwardly to form the pocket. The construction is such that contact between the marshmallow and the pocket is minimized as shown in Fig. 4, where a marshmallow 33 is shown in the pocket. Each tray 28 is provided with a handle 34 whereby it may be rocked about its pivot 29 to empty the toasted marshmallows into the discharge chute 19 and to a suitable container 36 which may be located in the compartment 18 below the discharge chute.

In operation the marshmallows to be toasted are placed in the respective pockets 25 as shown at 33 in Fig. 4, and the circuit for the toasting element 27 is closed by suitable movement of switch 37 in outlet box 38 having electrical connection 39 from a suitable source of power. When the marshmallows have been toasted to the desired extent the respective trays 28 are swung successively from the positions shown in Fig. 2 until the pockets open downwardly over the discharge chute 19 when the marshmallows will be discharged from the pockets 25 and fall into the box 36 for sale or other disposition.

I claim:

1. In a device of the character described a pocket for supporting an article at spaced points to expose a maximum amount of the article surface, a support for said pocket mounted for movement to place said pocket in article treating and discharging positions, and a heating element adjacent said pocket in the article treating position thereof for applying heat on article supported in said pocket.

2. In a device of the character described, a frame, a discharge chute mounted in said frame, a plurality of article treating trays pivotally mounted about said chute for movement from respective article treating positions to respective article discharging positions over said discharge chute, and article heating means associated with said trays.

3. In a device of the character described, a frame, a discharge chute mounted in said frame, an article treating tray movably mounted on said frame adjacent said chute, a plurality of article holding pockets in said tray, and a heating element for applying heat to articles in said pockets.

4. In a device of the character described, a frame, a discharge chute mounted in said frame, an article treating tray movably mounted on said frame for movement from an article treating position adjacent said chute to an article discharging position over said chute, a plurality of article holding pockets in said tray, and a heating element on said frame for applying heat to articles in said pockets in the article treating position of said tray.

5. In a device of the character described, a frame, a discharge chute mounted in said frame, an article treating tray movably mounted on said frame for movement from an article treating position adjacent said chute to an article discharging position over said chute, a plurality of article holding pockets in said tray, each pocket comprising spaced holding elements converging from an aperture in said tray to engage an article at spaced points whereby to expose a maximum amount of the article surface, and means for applying heat to articles in said pockets.

ROY CHESTER MARTIN.